United States Patent [19]

Sumikawa et al.

[11] 4,383,642

[45] May 17, 1983

[54] HEATER UNIT FOR USE IN AN AIR CONDITIONER FOR AUTOMOTIVE VEHICLES

[75] Inventors: Seiji Sumikawa; Kazuo Utsugi, both of Saitama, Japan

[73] Assignee: Diesel Kiki Co., Ltd., Saitama, Japan

[21] Appl. No.: 242,634

[22] Filed: Mar. 11, 1981

[30] Foreign Application Priority Data

Mar. 22, 1980 [JP] Japan .............................. 55-37836[U]
Aug. 15, 1980 [JP] Japan ............................ 55-115813[U]
Aug. 15, 1980 [JP] Japan ............................ 55-115814[U]

[51] Int. Cl.$^3$ .............................................. B60H 1/02
[52] U.S. Cl. ................................ 237/12.3 A; 236/13; 165/42; 98/2.05
[58] Field of Search .................... 237/12.3 A; 236/13; 98/2.05; 165/42

[56] References Cited

U.S. PATENT DOCUMENTS

4,108,376 8/1978 Matsuda et al. ............... 237/12.3 A
4,134,542 1/1979 Sugiura ............................... 236/13

FOREIGN PATENT DOCUMENTS

2530133 1/1977 Fed. Rep. of Germany ....... 98/2.05

*Primary Examiner*—William R. Cline
*Assistant Examiner*—John F. McNally

*Attorney, Agent, or Firm*—Frishauf, Holtz, Goodman & Woodward

[57] ABSTRACT

A heater unit for use in an air conditioner for automotive vehicles comprises: a casing formed therein with an air inlet passage, a discharging air passage communicating the air inlet passage with an upper or face-level air outlet or a floor air outlet, a heating air passage extending from the air inlet passage to the inlet of a heater core, and a hot air passage extending from the outlet of the heater core and terminating at least in a side wall of the heater core where it intersects with the discharging air passage; a temperature adjusting damper for adjusting the ratio of air being supplied from the air inlet passage to the discharging air passage and air being supplied from the air inlet passage to the heating air passage; and an auxiliary damper arranged at the intersection of the air discharge passage with the hot air passage or in its vicinity for interrupting the communication between the latter two passages. The auxiliary damper is adapted to be in a position to interrupt the communication of the air discharge passage with the hot air passage when the temperature adjusting damper is in the maximum cooling position, and in a position to allow the communication between the two passages when the temperature adjusting damper is in either of the maximum heating position and an intermediate position between the maximum heating position and the minimum cooling position.

8 Claims, 8 Drawing Figures

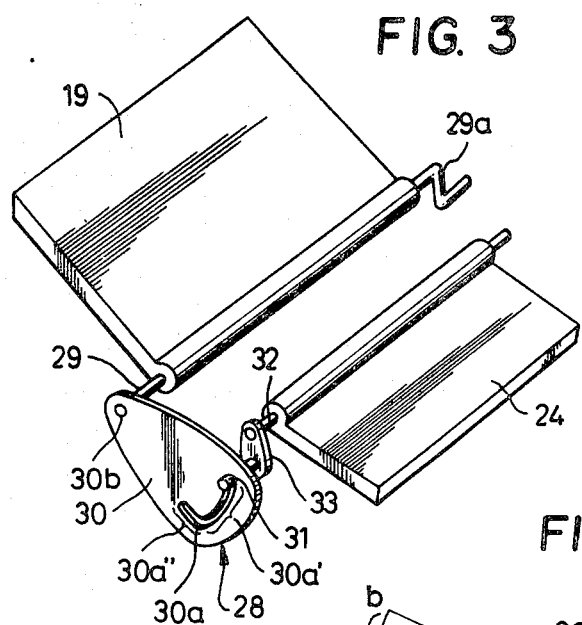
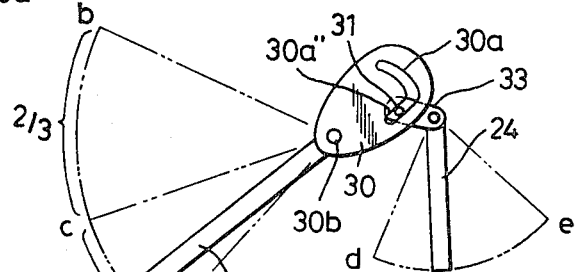
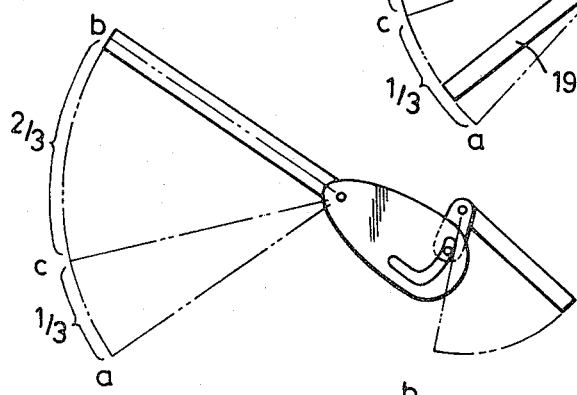
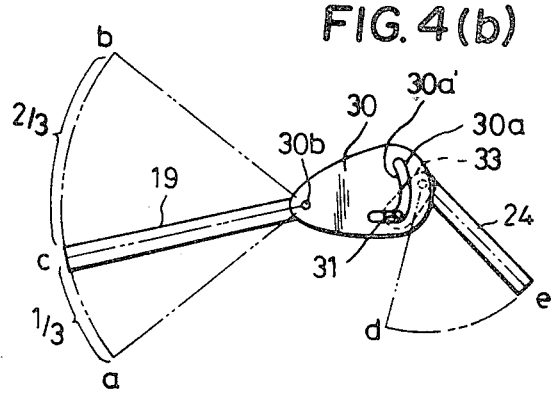

HEATER UNIT FOR USE IN AN AIR CONDITIONER FOR AUTOMOTIVE VEHICLES

BACKGROUND OF THE INVENTION

The present invention relates to air conditioners for use in automotive vehicles, and more particularly to improvements in or to the heater unit of such air conditioner, for heating refrigerated air supplied from the cooling unit and, when required, mixing refrigerated air and hot air to control the discharge air temperature.

A conventional heater unit of this kind is constructed such that a temperature adjusting damper is arranged in an air inlet passage connected to the outlet of a cooling unit, at its downstream end and is pivotable to allow part of refrigerated air supplied from the cooling unit to the air inlet passage to pass through a heater core provided therein, while allowing the remainder of the refrigerated air to bypass the heater core, and the resulting hot air and the bypassing air are mixed together at a zone downstream of the heater core so as to obtain a desired discharge air temperature. When this heater unit is in maximum cooling mode, the temperature adjusting damper is in a position to close the inlet of the heater core where all the refrigerated air supplied to the air inlet passage is guided directly to the discharging air passage, bypassing the heater unit. However, part of this bypassing air can be guided to the heater core through a hot air passage extending between the outlet of the heater core and the discharging air passage to be heated by the heater core, so that the resulting hot air is discharged into the passenger compartment of a vehicle associated with the heater unit, together with the remainder of the bypassing air, thus resulting in insufficient cooling inside the compartment.

To eliminate the above disadvantage, the conventional heater unit is usually provided with a water valve which is adapted to temporarily interrupt the supply of heating medium or hot water to the heater core when the heater unit is in maximum cooling mode. However, this valve is expensive, leading to a high manufacturing cost.

A low-cost type heater unit has therefore been proposed according to Japanese Utility Model Publication No. 54-27713, which includes an auxiliary damper which is used in place of the above-mentioned water valve and which is arranged opposite the outlet of the heater core for pivoting in unison with the temperature adjusting damper to selectively open and close the same outlet to thereby prevent part of the bypassing air delivered to the discharging air passage from being guided to the outlet of the heater core through the hot air passage to be heated directly by the heater core. However, according to this proposed structure, the auxiliary damper is heated by the heat of the heater core to eventually heat the bypassing air. Further, the auxiliary damper needs to be designed as large in size as the area of the outlet of the heater core, which requires providing a large space in front of the outlet of the heater core, for accomodating the auxiliary damper in a pivotable fashion. Therefore, the proposed heater unit is not suitable for use in an automotive vehicle in general which has a limited space for installment of the heater unit.

OBJECTS AND SUMMARY OF THE INVENTION

It is therefore an object of the invention to provide a heater unit for use in an air conditioner for automotive vehicles, in which an auxiliary damper is arranged at the outlet of a hot air passage extending between the outlet of the heater core and the discharging air passage for pivoting in unison with the temperature adjusting damper. The auxiliary damper is located so remotely from the heater core that it is not subject to heating by the heat of the heater core per se, while permitting a reduction in the space in front of the outlet of the heater core.

It is another object of the invention to provide a heater unit for use in an air conditioner for automotive vehicles, in which simple link means is used to operatively connect the auxiliary damper with the temperature adjusting damper. The heater unit is therefore inexpensive and seldom has trouble.

According to the invention, there is provided a heater unit for use in an air conditioner, which comprises: a casing having an interior thereof formed with an air inlet passage, a face-level air outlet opening in a peripheral wall of said casing at an upper portion thereof, a floor air outlet opening in a peripheral wall of said casing at a lower portion thereof, a discharging air passage extending between said air inlet passage and said face-level air outlet, a floor discharging air passage extending between said discharging air passage and said floor air outlet, a heating air passage branching from said air inlet passage, a hot air passage extending between said heating air passage and said discharging air passage, and a defroster air outlet opening in a peripheral wall of said casing in communicating with same; a heater core arranged within said casing at an intersection of said heating air passage with said hot air passage, said heater core having a first end wall formed with an inlet and facing said heating air passage, a second end wall formed with an outlet and facing said hot air passage, and two side walls extending between said end walls; said hot air passage extending along said second end wall of said heater core and also extending at least as far as one of said side walls thereof; a first damper for selectively opening and closing said face-level air outlet; a second damper for selectively opening and closing either said floor air outlet or said floor discharging air passage; a third damper pivotally arranged at a location between said air inlet passage and said discharging air passage; said third damper being disposed to allow air introduced into said air inlet passage to be guided into said discharging air passage alone, at a first extreme position thereof and allow said air to be guided into said heating air passage alone, at a second extreme position thereof, while allowing said air to be guided into both said discharging air passage and said heating air passage, at an intermediate position thereof between said first and second extreme positions; a fourth damper arranged at an intersection between said discharging air passage and said hot air passage or at a location in the vicinity of the last-mentioned intersection for selectively allowing and interrupting communication therebetween; and coupling means operatively connecting said third damper with said fourth damper, said coupling means being operable to bias said fourth damper in a position to interrupt the communication between said discharging air passage and said hot air passage when said third damper is in said first extreme position, and in a position to allow the same communication when said third damper is in either of said second extreme position and said intermediate position.

The above and other objects, features and advantages of the invention will be more apparent upon reading the ensuing description taken in connection with the accompanying drawings, in which:

BRIEF DESCRIPTION OF THE DRAWINGS

FIG. 3 is a perspective view of an example of link means coupling the auxiliary damper to the temperature adjusting damper;

FIGS. 4(a)–4(c) are views showing the operation of the link means in FIG. 3;

DETAILED DESCRIPTION

Figure 1:
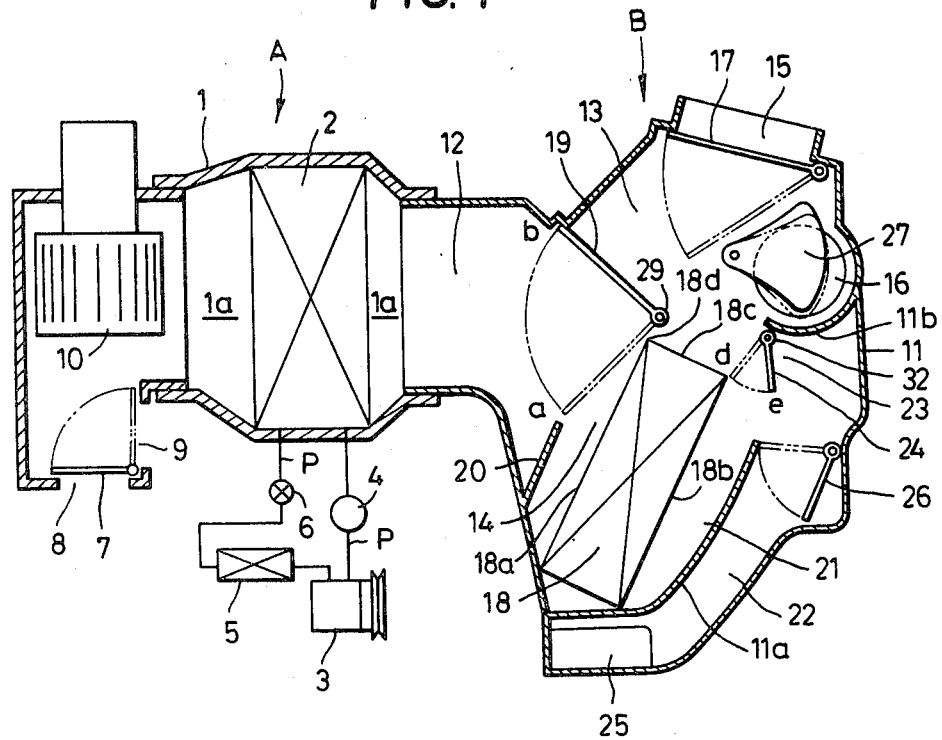
FIG. 1 is a vertical sectional view of an air conditioner for automotive vehicles, which is provided with a heater unit according to a first embodiment of the present invention.

Referring to the drawings, wherein like reference characters designate like or corresponding parts throughout the several views, FIG. 1 illustrates an air conditioner for use in automotive vehicles, which is equipped with a heater unit according to a first embodiment of the present invention. In FIG. 1, symbol A designates the main body of the air conditioner. The main body A comprises a main body casing 1 formed therein with an air passage 1a within which an evaporator core 2 is arranged for refrigerating air introduced into the main body casing 1. The evaporator core 2 is connected to a compressor 3, an accumulator 4, a condenser 5 and an expansion valve 6 arranged in series through a pipe P, like an ordinary conventional air conditioner.

An inside air-outside air change-over damper 7 is arranged at the inlet of the air passage 1a at a location upstream of the evaporator core 2, which is pivotable to selectively open an inside or recirculated air inlet 8 and an outside air inlet 9 formed in the main body casing 1. A blower 10 is arranged in the same air passage 1a at a location downstream of the inlets 8, 9, which operates to suck air through one of the inlets 8, 9 selected by the damper 7 and feeds it to the evaporator core 2.

As illustrated in FIG. 1, a heater unit generally indicated at symbol B is connected to the main body A of the air conditioner. The casing 11 of the heater unit B is formed therein with an air inlet passage 12 which communicates with the air passage 1a of the main body A at a location downstream of the evaporator core 2. The air inlet passage 12 is supplied with refrigerated air from the air passage 1a during operation of the evaporator core 2, while it is supplied with outside air, which is not refrigerated, from the same passage 1a when the evaporator core 2 is at rest where the inside air-outside air change-over damper 7 opens the outside air inlet 8. The air inlet passage 12 is divided at its downstream end into a discharging air passage 13 and a heating air passage 14.

The discharging air passage 13 extends from the air inlet passage 12 and leads to an upper or face-level air outlet 15 opening in a peripheral wall of the casing 11 at its upper portion as well as a defroster air outlet 16. The upper or face-level air outlet 15 is provided with a mode damper 17 disposed for selectively opening and closing same. The heating air passage 14 extends from the air inlet passage 12 and terminates in an inlet-formed end wall 18a of a heater core 18 for guiding air from the air inlet passage 12 to the heater core 18. The heater core 18 is not provided with a water valve for controlling the amount of hot water being supplied thereto and is therefore permanently supplied with hot water, e.g., from an automotive engine. To cope with this permanent supply of hot water, the tanks, not shown, which are provided at the opposite sides of the heater core 18 are made of a material having a large thermal resistance such as synthetic resin.

Arranged at a location downstream of the air inlet passage 12 is a temperature adjusting damper 19 which is pivoted to a stationary support 29 located in the vicinity of the corner 18d of the heater core 18 between the end wall 18a of the heater core 18 and a side wall 18c of same. The damper 19 is pivotable to vary the ratio of air being supplied to the discharging air passage 13 from the air inlet passage 12 and air being supplied to the heating air passage 14 from the passage 12. More specifically, in maximum heating mode, the temperature adjusting damper 19 is biased in position b with its tip in contact with an upper peripheral wall of the casing 11 as indicated by the solid line in FIG. 1, where the discharging air passage 13 is closed, while in maximum cooling mode it is biased in position a with its tip in contact with a protuberance 20 formed on a peripheral wall of the casing 11 in the vicinity of the inlet of the heater core 18, as indicated by the two-dot chain line where the heating air passage 14 is closed. When the damper 19 is in an intermediate position between the two extreme positions a, b, adjustment of the discharge air temperature can be effected by varying the angular position of the damper 19.

A hot air passage 21 is defined between the other end wall 18b of the heater core 18 formed with an outlet and a partition wall 11a extending substantially in parallel with the heater core 18. This hot air passage 21 extends along the end wall 18b of the heater core 18 and leads to the side wall 18c of same to communicate the outlet of the heater core 18 with a by-pass passage 23 hereinafter referred to.

Figure 2:
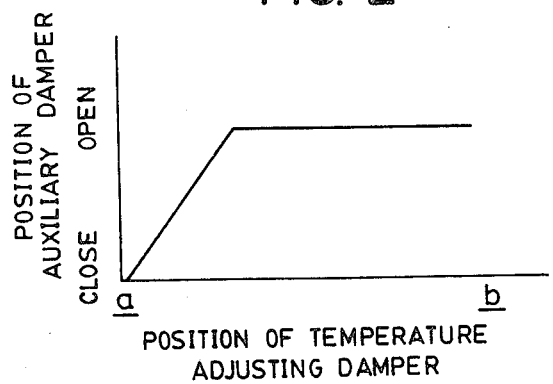
FIG. 2 is a graph showing the relationship between the opening of the temperature adjusting damper and the opening of the auxiliary damper used in the heater unit according to the present invention.

The by-pass passage 23 extends along the side wall 18c of the heater core 18 to intersect with a floor discharging air passage 22 hereinafter referred to, to communicate the discharging air passage 12 with the floor discharging air passage 22. The by-pass passage 23 has its downstream end portion partitioned from the defroster air outlet 16 by a partition wall 11b extending from the periphery of the casing 11. The hot air passage 21 intersects with this by-pass passage 23 at a location in the vicinity of the side wall 18c of the heater core 18. An auxiliary damper 24 is arranged within the by-pass passage 23, which is pivoted to a stationary support 32 for pivotal movement to selectively open and close the by-pass passage 23. This auxiliary damper 24 is located between the intersection of the hot air passage 21 with the by-pass passage 23 and the heater core 18. The auxiliary damper 24 is pivotable in unison with the temperature adjusting damper 19 by means of link means hereinafter referred to. More specifically, as shown in FIG. 2, when the temperature adjusting damper 18 is in the position a (maximum cooling position), the auxiliary damper 24 is biased to close the by-pass passage 23. Then, as the temperature adjusting damper 19 is displaced until it opens the heating air passage 14 to about one third of its maximum opening, the auxiliary damper 24 is correspondingly displaced to gradually open the by-pass passage 23. When the temperature adjusting damper 19 is positioned between a position where the heating air passage is opened to more than about one third of its maximum opening and the position b (maximum heating position), the auxiliary damper 24 is in a position to fully open the by-pass passage 23. Therefore, in maximum cooling mode, the temperature adjusting damper 19 is positioned in the position a, while simultaneously the auxiliary damper 24 fully closes the by-pass passage 23, fully preventing refrigerated air introduced into the by-pass passage 23 from being guided to the heater core 18 through the hot air passage 21.

The floor discharging air passage 22 is defined by the above-mentioned partition wall 11a and a peripheral wall of the casing 11, which extends from the by-pass passage 23 to a floor air outlet 25 opening in the bottom of the casing 11. A mode damper 26 is mounted at the inlet of the floor discharging air passage 22, which is pivotable in unison with a mode damper 27 arranged for selectively opening and closing the defroster air outlet 16.

FIG. 3 illustrates link means coupling the temperature adjusting damper 19 to the auxiliary damper 24. This link means 28 comprises a cam plate 30 which is secured at its one end to a stationary support 27 pivotally supported by the casing 11 and on which the temperature adjusting damper 19 is secured at its one end, and a link member 33 which has one end secured to a rod 31 which is engaged in a camming slot 30a formed in the cam plate 30 and the other end secured to a stationary support 32 which is pivotally supported by the casing 11 and on which the auxiliary damper 24 is secured at its one end. The end of the stationary support 29 which is remote from the cam plate 30 is projected outside the casing 11. This projected end of the support 29 is angled as designated as numeral 29a and coupled to a pivoting means, not shown, such as a wire. The camming slot 30a formed in the cam plate 30 comprises a first portion 30a' extending along a curve having its center of curvature formed by a fulcrum 30b at which the support 29 is coupled to the cam plate 30, and a second portion 30a" extending continuously from the first portion 30a' toward the fulcrum 30b. The ratio of the length of the first portion 30a' to that of the second portion 30a" is set at 3:1.

With the above arrangement of the link means 29, as shown in FIG. 4 (a), as the temperature adjusting damper 19 is moved between the maximum cooling portion a and the position c corresponding to one third of the maximum pivotable angle, the rod 31 on the link 33 secured integrally to the auxiliary damper 24 is moved along the second portion 30a" of the camming slot 30a formed in the cam plate 30 which is then pivotally displaced about the fulcrum 30b in unison with the damper 19. Consequently, the auxiliary damper 24 is pivotally displaced from its closing position d in unison with the above pivotal displacement of the temperature adjusting damper 19. When the temperature adjusting damper 19 has reached the position c corresponding to one third of the maximum pivotable angle, the rod 31 on the link 33 is positioned at the boundary between the first and second portions 30a', 30a" of the camming slot 30a, as shown in FIG. 4 (b), to have the auxiliary damper 24 positioned in its rightmost position e where the by-pass passage 23 in FIG. 1 is opened to its maximum opening. Then, as the temperature adjusting damper 19 is moved from the position c to the maximum cooling position b, the rod 31 is moved along the first portion 30a' of the camming slot 30a. On this occasion, the first portion 30a' extending at a constant distance from the fulcrum 30b, the auxiliary damper 24 is not pivotally displaced, that is, remains at the maximum opening position e (FIGS. 4 (b), (c)).

With the above-described arrangement, in maximum heating mode, the temperature adjusting damper 19, the auxiliary damper 24 and the mode dampers 17, 26, 27 are positioned in their respective positions indicated by the solid lines in FIG. 1, where all the air introduced into the air inlet passage 12 is guided into the heating air passage 14 to be heated by the heater core 18. A large proportion of the air thus heated is guided through the floor discharging air passage 22 and discharged into the passenger compartment through the floor air outlet 25, while the remainder of the heated air is discharged into the compartment through the defroster air outlet 16.

On the other hand, in maximum cooling mode, the temperature adjusting damper 19, the auxiliary damper 24 and the mode dampers 17, 26, 27 are positioned in their respective positions indicated by the two-dot chain lines in FIG. 1, where all the air introduced into the air inlet passage 12 is guided through the discharging passage 13 and directly discharged through the upper or face-level air outlet 15 into the compartment.

In the so-called air-mix mode in which part of the refrigerated air introduced into the air inlet passage 12 is heated and then mixed with the remainder of the refrigerated air so as to adjust the discharge air temperature, and which is available in either of the cooling mode and the heating mode, the temperature adjusting damper 19 is positioned in an intermediate position between the extreme positions a, b at an angle corresponding to a desired discharge air temperature where the auxiliary damper 24 opens the by-pass passage 23 to an opening corresponding to the opening then assumed by the temperature adjusting damper 19 in accordance with the relationship between the dampers 19, 24 shown in FIG. 2, while the mode dampers 17, 26, 27 assume their respective positions selected by the operator. With the dampers in these positions, the refrigerated air delivered by the evaporator core 2 into the air inlet passage 12 is divided into two streams flowing, respectively, in the discharging air passage 13 and the heating air passage 14, with the ratio of the two streams adjusted in response to the angular position of the temperature adjusting damper 19. While one of the two streams is fed from the air inlet passage 12 into the discharging air passage 13, the other stream passes the heated core 18 to be heated thereby and is then mixed with the above one stream at a location upstream of the by-pass passage 23 or at a location downstream of same, to be discharged into the passenger compartment through the upper or face-level air outlet 15 or the floor air outlet 25. In this air-mix mode, when the temperature adjusting damper 19 opens the heating air passage 14 to one third or more of its maximum opening, the auxiliary damper 24 fully opens the by-pass passage 23, as noted above. Therefore, the discharge air temperature can be controlled solely by varying the opening of the temperature adjusting damper 19, making it possible to control the discharge air temperature with accuracy in response to the angular position of a temperature control lever, not shown, which is connected to the damper 19.

Figure 5:
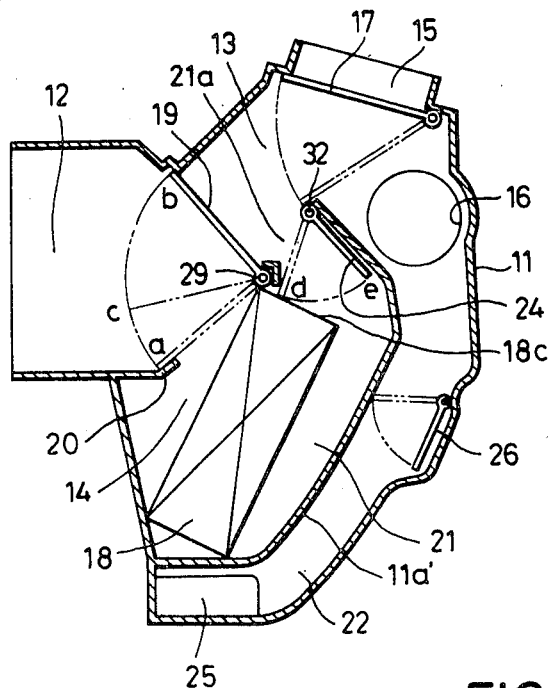
FIG. 5 is a vertical sectional view of a heater unit according to a second embodiment of the present invention.

FIG. 5 illustrates a heater unit according to another embodiment of the invention. According to this embodiment, a partition wall 11a' is formed in place of the partition wall 11a in FIG. 1, which extends as far as the discharging air passage 13, and the defroster air outlet 16 communicates directly with the floor air outlet 22, with the partition wall 11b in FIG. 1 omitted. The hot air passage 21 is defined by the heater core 18 and the partition wall 11a' and communicates directly with the discharging air passage 13, with the by-pass passage 23 in FIG. 1 omitted. Also, the mode damper 27 used in the arrangement of FIG. 1 for opening or closing the defroster air outlet 16 is omitted.

The hot air passage 21 starts from the outlet of the heater core 18 and extends along a side wall 18c of the heater core 18, leading to the discharging air passage 13. The passage 21 has its outlet end 21a opening in the discharging air passage 13 in the vicinity of the pivotal support 29 of the temperature adjusting damper 19.

The auxiliary damper 24 is arranged for pivotal movement about the support 32 which is located in the vicinity of the support 29 of the temperature adjusting damper 19, for selectively opening and closing the outlet end 21a of the hot air passage 21. This auxiliary damper 24 is connected with the temperature adjusting damper 19 through link means, not shown, which is similar to the link mechanism 28 shown in FIG. 3, for pivotal movement in unison with the pivotal movement of the temperature adjusting damper 19 in a manner identical with that employed in the FIG. 1 arrangement. That is, as the damper 19 is moved from the maximum cooling position a to the one-third opening position c, the damper 24 is correspondingly moved from the closing position d, while as the damper 19 is moved from the position c to the maximum heating position b, the damper 24 is held in its maximum opening position e.

Except for the above-mentioned points, the arrangement according to this embodiment is generally similar to that according to the embodiment illustrated in FIG. 1, detailed description of which is omitted here.

With the FIG. 5 arrangement, in maximum heating mode, the temperature adjusting damper 19, the auxiliary damper 24 and the mode dampers 17, 26 are positioned in their respective positions indicated by the solid lines in FIG. 5, the air heated by the heater core 18 is guided through the hot air passage 21 into the discharging air passage 13, and is then guided through the floor discharging air passage 22 to be discharged into the passenger compartment through the floor air outlet 25.

On the other hand, in maximum cooling mode, the temperature damper 19, the auxiliary damper 24 and the mode dampers 17, 26 are positioned in their respective positions indicated by the two-dot chain lines in FIG. 5, the refrigerated air introduced into the air inlet passage 12 is directly delivered into the discharging air passage 13 to be discharged through the upper or face-level air outlet 15. On this occasion, the auxiliary damper 24 fully closes the outlet end 21a of the hot air passage 21, to completely isolate the discharging air passage 13 from the heater core 18. This arrangement can prevent the refrigerated air in the discharging air passage 13 from passing along the side wall 18 of the heater core 18 to be heated thereby, as distinct from the arrangement of FIG. 1.

Incidentally, in air-mix mode, the temperature adjusting damper 19 is positioned in an intermediate position between the extreme positions a, b, while simultaneously the auxiliary damper 24 is positioned in an intermediate position between the extreme positions d, e or in the position e, wherein refrigerated air introduced into the air inlet passage 12 and bypassing the heater core 18 and hot air passing through the heating air passage 14, the heater core 18 and the hot air passage 21 are mixed together at the discharging air passage 13, to be discharged into the passenger compartment through the upper air outlet 15 or through the floor air outlet 22 via the floor discharging air passage 25.

Figure 6:
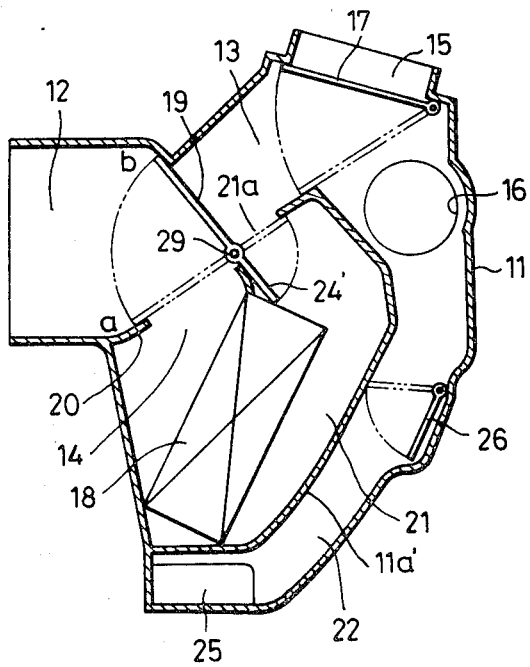
FIG. 6 is a vertical sectional view of a heater unit according to a third embodiment of the present invention.

FIG. 6 illustrates a heater unit according to still another embodiment of the invention. The arrangement according to this embodiment is distinguished from that illustrated in FIG. 5 only in that the auxiliary damper is formed integrally on the temperature adjusting damper 19. More specifically, the auxiliary damper 24' is formed integrally on the temperature adjusting damper 19 in a fashion extending from the end of the temperature adjusting damper 19 pivoted to the support 29 in a direction directly opposite to the damper 19, for pivotal movement in unison with the damper 19 about the common support 29. The peripheral portion of the casing 11 corresponding to the maximum cooling position a of the temperature adjusting damper 19, the heater core 18 and the portion of the partition wall 14a' corresponding to the outlet end 21a of the hot air passage 21 are arranged and configurated such that when the temperature adjusting damper 19 is positioned in the maximum heating position b, the auxiliary damper fully opens the outlet end 21a of the hot air passage 21, while the former is positioned in the maximum cooling position a, the latter fully closes the outlet end 21a.

Incidentally, in air-mix mode where the temperature adjusting damper 19 is positioned in an intermediate position between the extreme positions a, b, the auxiliary damper 24' is always pivotally moved correspondingly to pivotal movement of the temperature adjusting damper 19 so that the damper 24' has its opening varying in proportion to a change in the opening of the damper 19, as distinct from the arrangements of FIGS. 1 and 5.

The formation of the auxiliary damper and the temperature adjusting damper in a single piece as noted above dispenses with the link means 28 illustrated in FIG. 3, resulting in the possibility of a reduction in the manufacturing cost.

Obviously many modifications and variations of the present invention are possible in the light of the above teachings. It is therefore to be understood that within the scope of the appended claims, the invention may be practiced otherwise than as specifically described.

What is claimed is:

1. A heater unit for use in an air conditioner, which comprises: a casing having an interior thereof formed with an air inlet passage, a face-level air outlet opening in a peripheral wall of said casing at an upper portion thereof, a floor air outlet opening in a peripheral wall of said casing at a lower portion thereof, a discharging air passage extending between said air inlet passage and said face-level air outlet, a floor discharging air passage extending between said discharging air passage and said floor air outlet, a heating air passage branching from said air inlet passage, a hot air passage extending between said heating air passage and said discharging air passage, and a defroster air outlet opening in a peripheral wall of said casing in communicating with same; a heater core arranged within said casing at an intersection of said heating air passage with said hot air passage, said heater core having a first end wall formed with an inlet and facing said heating air passage, a second end wall formed with an outlet and facing said hot air passage, and two side walls extending between said end walls; said hot air passage extending along said second end wall of said heater core and also extending at least as far as one of said side walls thereof; a first damper for selectively opening and closing said face-level air outlet; a second damper for selectively opening and closing either said floor air outlet or said floor discharging air passage; a third damper pivotally arranged at a location between said air inlet passage and said discharging air passage; said third damper being disposed to allow air introduced into said air inlet passage to be guided into said discharging air passage alone, at a first extreme position thereof and allow said air to be guided into said heating air passage alone, at a second extreme position thereof, substantially all said air thus guided into said heating air passage being delivered into said heater core, while allowing said air to be guided into both said discharging air passage and said heating air passage, at an intermediate position thereof between said first and second extreme positions; a fourth damper located remotely of said heater core and arranged at an intersection between said discharging air passage and said hot air passage or at a location in the vicinity of the last-mentioned intersection for selectively allowing and interrupting communication therebetween, said fourth damper being movable to a fully closed position to prevent any backflow to said heater core through said hot air passage when in said fully closed position; and coupling means operatively connecting said third damper with said fourth damper, said coupling means being operable to bias said fourth damper in a position to interrupt the communication between said discharging air passage and said hot air passage to prevent part of air in said discharging air passage from being guided to said heater core through said hot air passage when said third damper is in said first extreme position, and in a position to allow the same communication when said third damper is in either of said second extreme position and said intermediate position.

2. The heater unit as claimed in claim 1, wherein said discharging air passage includes a by-pass passage extending along said one side wall of said heater core and intersecting with said floor discharging air passage, said hot air passage intersecting with said by-pass passage at a location in the vicinity of said one side wall of said heater core, said fourth damper being arranged within said by-pass passage at a location between said heater core and the intersection between said hot air passage and said by-pass passage, wherein said coupling means is operable to cause said fourth damper to close said by-pass passage when said third damper is in said first extreme position, and open said by-pass passage when said third damper is in either of said second extreme position and said intermediate position.

3. The heater unit as claimed in claim 2, wherein said coupling means is adapted to cause said fourth damper to open said by-pass passage to a maximum opening thereof when said third damper is in an intermediate position to open said heating air passage to at least approximately one third of a maximum opening thereof.

4. The heater unit as claimed in claim 1, including a first support arranged in said casing in the vicinity of a corner of said heater core between said first end wall of said heater core and said one side wall thereof and pivotally supporting said third damper, and a second support arranged in said casing in the vicinity of said first support and pivotally supporting said second end wall of said heater core and along said one side wall thereof, said hot air passage having an outlet end opening in said discharging air passage at a location in the vicinity of said first support, wherein said coupling means is adapted to cause said fourth damper to close said outlet end of said hot air passage when said third damper is in said first extreme position, and open the same outlet end when said third damper is in either of said second extreme position and said intermediate position.

5. The heater unit as claimed in claim 4, wherein said coupling means is adapted to cause said fourth damper to open said outlet end of said hot air passage to a maximum opening thereof when said third damper is in an intermediate position to open said heating air passage to at least approximately one third of a maximum opening thereof.

6. The heater unit as claimed in claim 1, including a support arranged in said casing in the vicinity of a corner of said heater core between said first end wall of said heater core and said one side wall thereof and pivotally supporting said third damper, said fourth damper being formed integrally on said fourth damper, said hot air passage extending from said second end wall of said heater core and along said one side wall thereof, said hot air passage having an outlet end thereof opening in said discharging air passage at a location in the vicinity of said support, wherein said fourth damper is adapted to close said outlet end of said hot air passage when said third damper is in said first extreme position, and open the same outlet when said third damper is in either of said second extreme position and said intermediate position.

7. The heater unit as claimed in claim 1, wherein said fourth damper is arranged at the outlet of a hot air passage extending between the outlet of the heater core and the discharging air passage.

8. The heater unit as claimed in claim 1 or 7, wherein said first extreme position of said third damper is a fully closed position corresponding to a maximum cooling mode of heater unit.

* * * * *